May 10, 1960  C. J. COBERLY  2,936,162

CERAMIC CHECKER AND ASSEMBLY THEREOF

Filed July 26, 1956

INVENTOR
CLARENCE J. COBERLY
BY HIS ATTORNEYS
HARRIS, KIECH, FOSTER & HARRIS

United States Patent Office 2,936,162
Patented May 10, 1960

2,936,162

CERAMIC CHECKER AND ASSEMBLY THEREOF

Clarence J. Coberly, San Marino, Calif., assignor to Wulff Process Company, Huntington Park, Calif., a corporation of California Application July 26, 1956, Serial No. 600,181

15 Claims. (Cl. 263—51)

This invention relates to a ceramic checker and assembly of such checkers having particular utility in furnaces adapted for the pyrolytic decomposition of hydrocarbons of high temperatures. Although the invention is described hereinafter in connection with such use thereof, it is to be understood that the invention has other uses and I do not desire to be limited to the particular embodiment illustrated and described herein.

It is conventional in high temperature regenerative furnaces employed for the pyrolytic decomposition of hydrocarbons to form a heat regenerative mass or masses of a number of special checkers or tile formed of ceramic material. Such a furnace is illustrated in the patent to R. L. Hasche et al., No. 2,692,819, issued October 26, 1954, and such checkers or tile are illustrated and described in the patent to R. L. Hasche No. 2,622,864, issued December 23, 1952, the latter generally describing a usual method of using such checkers and certain of the problems in connection therewith.

In such a regenerative furnace employing high temperature vapor phase reactions it is important to have a ceramic or other regenerative mass capable of absorbing heat and acting as a heat reservoir to supply the heat required for such reactions. Such reactions require temperatures in the range from 750° C. to 1500° C. and a ceramic mass in which a large heat energy transfer is required and in which the heat transfer must be accomplished in a very short interval of time. In some cases, such time interval may be as short as 0.01 second or less and seldom, if ever, more than 1.0 second. It is a primary object of this invention to provide such a mass formed in a novel way from the checkers of this invention. Such mass is particularly useful in the production of acetylene, ethylene, and other olefins by the pyrolytic decomposition of petroleum fractions, but is not limited thereto.

The geometry of a ceramic checker and a regenerative mass formed by an assembly of such checkers is very important in a furnace of the type referred to above. In order to obtain high heat transfer rates in the use of such a mass it is essential to employ a mass having passages or flues therethrough which have the correct hydraulic radius and which has the right relationship between the cross-sectional area of the solid portion of the mass and the total cross-sectional area of the passages therethrough to obtain maximum heat transfer characteristics, and this is a further object of my invention.

Conventional checkers of the type disclosed in said Hasche Patent No. 2,622,864 have a number of disadvantages. Such checkers, when made of alundum as is usual, are formed in thin flat plates having parallel semicircular grooves in each side, the grooves in one side being staggered with respect to those in the other side. Such plates are quite wide relative to their length in the direction of the grooves, normally having a width of about 9 inches and a length of about 6.75 inches. Such conventional checkers have no means of interlocking them with adjacent checkers in a regenerative mass formed thereof, and since such checkers are laid in layers side-by-side and end-to-end slight differences in dimensions will prevent accurate alignment of the plates vertically and horizontally which frequently misaligns the grooves both vertically and horizontally. Such misalignment of the grooves substantially reduces the hydraulic radius of the holes or flues intended to be formed thereby which results in a reduction of the velocity of flow of gases therethrough. In such a construction, since the various grooves are misaligned in varying degrees, uniformity of flow through all of the holes or flues is impossible, with an attendant reduction of yield from the desired reactions therein.

Such conventional checkers, due to their form, are difficult to manufacture because they tend to warp during firing, which increases the difficulties of correct alignment and matching in such a mass and sometimes makes it impossible. Also, the mechanical properties of such conventional checkers are very poor, the same tending to crack and split when exposed to high furnace temperatures and when substantially loaded with superimposed weight due to the vertical stacking thereof.

The foregoing disadvantages of conventional checkers and the regenerative masses formed therewith are largely obviated by my present invention, and this is an object of the invention. The checkers which are the subject of this invention have a high section modulus, are readily manufactured, provide means for interlocking when assembled into a regenerative mass so as to form substantially uniform holes or flues therethrough which substantially improves results, and provide a mass having great inherent strength against crushing or cracking of the checkers each of which is a further object of the invention.

Other objects and advantages of the invention will appear in the specification and drawings, which are for the purposes of illustration only, and in which.

Figure 1:
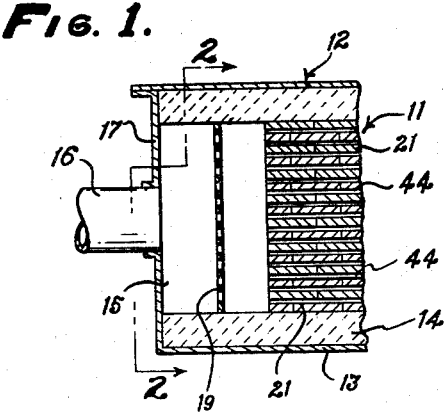
Fig. 1 is a vertical longitudinal sectional view through one end of a furnace embodying a regenerative mass of checkers of the present invention.
Figure 2:
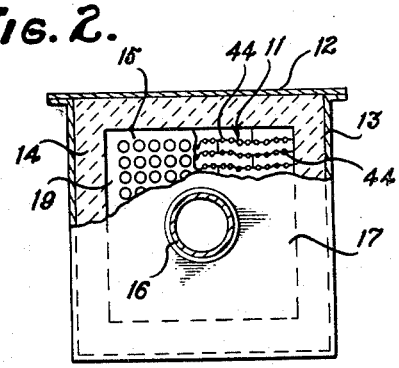
Fig. 2 is a cross-sectional view taken on the line 2—2 of Fig. 1.
Figure 4:
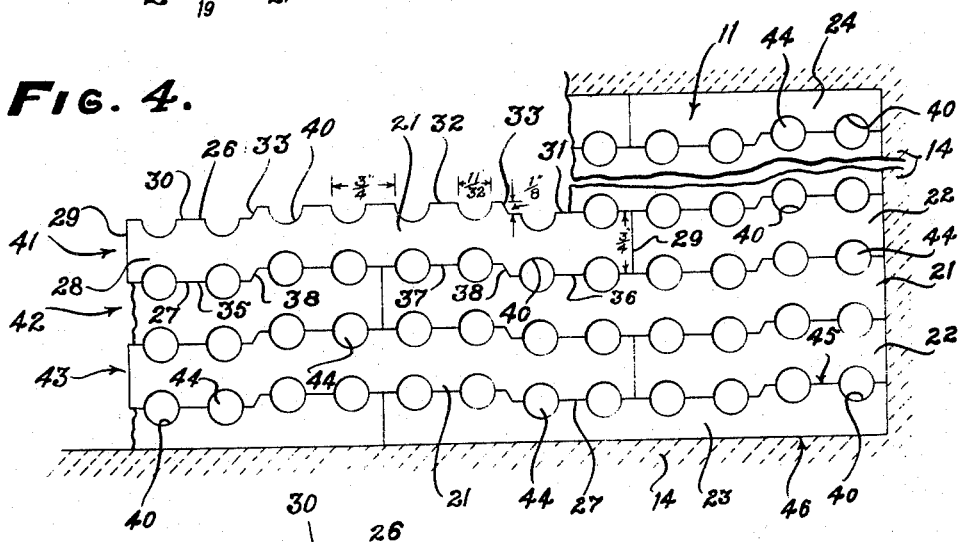
Fig. 4 is an enlarged cross-sectional view of a part of the regenerative mass of Fig. 2.
Figure 3:
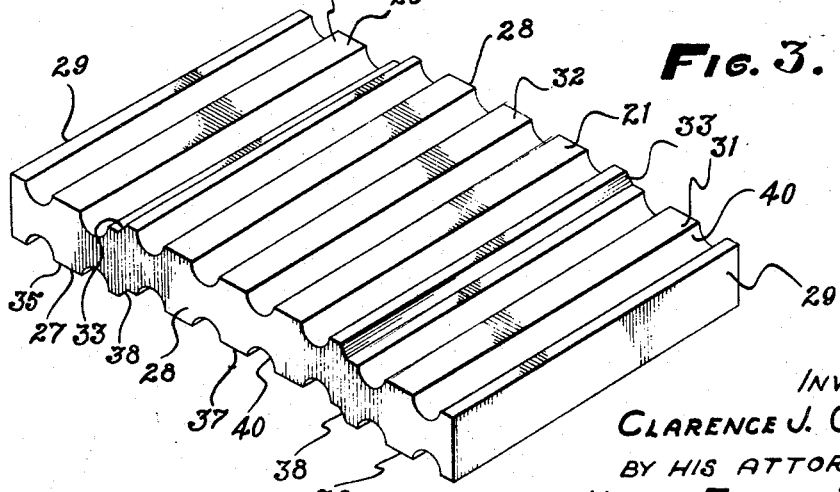
Fig. 3 is a perspective view of one of the checkers of the invention.

Referring to Figs. 1 and 2 of the drawings, I show a checker mass 11 contained in a furnace 12 having an outer metal shell 13 and a lining 14 formed of fire brick or other heat resistant material. The furnace 12 has an end space 15 which communicates with a pipe 16 in an end wall 17 for the passage of gas into or from the space 15, the space having a transverse perforated distribution plate 19 therein to aid in the distribution of gas to the end of the checker mass 11. As best shown in Fig. 4 the checker mass 11 includes full central checkers 21, half central checkers 22, full edge checkers 23, and half edge checkers 24.

Each of the full central checkers 21 has one face 26, another face 27, end edges 28, and side edges 29. The face 26 has edge surfaces 30 and 31 in the same plane and separated by a central surface 32 in a plane slightly separated from the plane of the edge surfaces and connected therewith by bevelled steps 33. The other face 27 has edge surfaces 35 and 36 in the same plane and separated by a central surface 37 in a plane slightly separated from the plane of the edge surfaces and connected therewith by bevelled steps 38. The central surfaces 32 and 37 are displaced from the plane of the edge surfaces 30, 31 and 35, 36, respectively, a small but equal distance. In the preferred form illustrated this distance is approximately ⅛ inch, the width of the full central checker (shown in Fig. 4) is approximately six inches and its length may be nine inches, with a thickness of approximately ¾ inch. Such checkers are preferably formed of aluminum oxide, magnesium oxide, zirconium oxide, silicon carbide, or a similar material which can be subjected to high temperatures in the range of 750° C. to 1500° C. over substantial periods of time without injury. Also, as shown in Fig. 4, the central surface 32 is twice the width of each of the edge surfaces 30 and 31, and, similarly, the central surface 37 is twice the width of the edge surfaces 35 and 36.

Formed in the faces 26 and 27 are semi-circular grooves 40 which extend longitudinally of the checker, there being two of such grooves 40 in each of the edge surfaces 30, 31, 35, and 36, and four of such grooves 40 in each of the central surfaces 32 and 37, such grooves being parallel and equally spaced across the checker, each groove in one face being vertically aligned with a groove in the other face. Thus, in the form shown there are half as many grooves in each edge surface as in the adjacent central surface. In the preferred embodiment described, each groove has a diameter of approximately 13/32 inch, and the total cross-sectional area of the grooves in any one checker is approximately 30.1% of the cross-sectional area of the ceramic of the checker, and approximately this relationship is important in many uses of the checkers to obtain optimum heat storage and heat transfer characteristics. The area of the grooves is 23.1% of the gross cross-sectional area of the checker.

An important feature of my checker 21 is that its bending strength is much higher than that of the conventional checkers commonly in use and described above. For example, my preferred form of checker described herein has a section modulus about the longitudinal axis of approximately 3.10 inches$^3$, whereas such a conventional checker having the same flow and mass-area ratio has a section modulus of only about 2.30 inches$^3$. Again, in my checker the moment of inertia is about 0.134 inch$^4$ whereas in such conventional checker it is only about 0.072 inch$^4$, and thus the bending strength of my checker is increased approximately 50% and the stiffness doubled as compared to such conventional checker.

As shown in Fig. 4, the full central checkers 21 are assembled together in the checker mass 11, the checkers being laid side-by-side in horizontal layers and the layers are stacked one on top of another. As shown in Fig. 1, each layer is made up of such checkers laid end-to-end. As shown in Fig. 4, all of the checkers in one layer 41 are oriented the same, and in the next lower layer 42 the checkers are inverted, and in the next lower layer 43 the checkers are oriented as in layer 41. This provides a full lateral interlock between layers which provides structural strength and stability.

To provide longitudinal alignment of the checkers in the mass 11, the checkers in adjoining layers are laid abutting end-to-end but staggered vertically, as illustrated in Fig. 1. To finish out the ends of the mass 11 and to provide a continuous end face at each end thereof, half length checkers of the various types described above are provided. These half length checkers may be formed half length, or may be formed by sawing the checkers 21, 22, 23, and 24, or any of them, in half lengthwise.

This lateral and longitudinal interlock insures that the grooves in one checker will be accurately aligned and matched with the grooves in the adjacent checkers above and below to provide circular holes or flues 44 extending longitudinally through the mass which are all substantially circular, each having a hydraulic radius of approximately 0.10 inch, which is very desirable. Due to the vertical alignment of the rows of holes 44, the mass 11 provides what in effect are vertical columns of solid material between such rows, which increases the safe stacking height of the checkers. This is important when the checkers are used in a furnace operating at high temperatures, as the stress on the plates due to the weight load thereon may approach the crushing strength of the checkers when they are made of ceramic materials, the strength of such materials at high temperatures being much higher in compression than in bending and shear. In my checkers bending and shear stresses are minimized, whereas in a mass of conventional checkers as described above such bending and shear stresses on the checkers are substantially greater and materially reduce the maximum size of a practical mass below that which can be obtained by the use of the present invention.

To complete the checker mass 11 of rectangular cross-section the half central checkers 22, the full edge checkers 23, and the half edge checkers 24 are provided. Each half central checker 22 is simply one half of a full central checker 21, as shown in Fig. 4. Each full edge checker 23 has one face 45 identical with the face 27 of the checker 21 and another plane face 46 adapted to fit flat against the lining 14. Each half edge checker 24 is simply one half of a full edge checker, as shown in Fig. 4. With this arrangement, as shown in Fig. 2, there are no semi-circular holes in the mass 11. This is an important feature of the invention, as any semi-circular holes would have a smaller hydraulic radius than the full holes 44 and gas passing through such semi-circular passages would move at a lower average velocity and hence residence time of the gas in such passages in the mass would be excessive when the furnace is used at high temperature for the pyrolytic decomposition of a hydrocarbon to produce acetylene, for example. In such case, assuming the residence time of the gas in the circular holes 44 to be correct for optimum yields of acetylene, such gas would be over-cracked in any such semi-circular passages. With my checker construction a mass of any size can be assembled with all holes having substantially equal hydraulic radius.

It will be understood that although the invention is disclosed as employed in a horizontal furnace, for which it is particularly adapted, it could also be used in a vertical furnace, or the checkers could be assembled on edge in such a horizontal furnace. Consequently, it is to be understood that such relative terms as "top," "bottom," "above," "below," and the like are used in this specification and the claims simply for convenience of description and are not intended to be limiting in any way.

I claim as my invention:

1. A heat regenerative checker comprising a solid block of refractory material, the block being generally rectangular in form and having a length and width substantially greater than its thickness and having upper and lower faces, one of said faces having a first surface in a first plane and a second surface in a second plane parallel to but vertically spaced from said first plane, and a plurality of parallel semi-circular grooves in each of said surfaces.

2. A heat regenerative checker as set forth in claim 1, in which the diameter of each of said grooves is approximately one-half the maximum thickness of the block.

3. A heat regenerative checker as set forth in claim 1, in which the thickness of said block is approximately 0.75 inch and the diameter of each of said grooves is approximately 0.41 inch.

4. A heat regenerative checker as set forth in claim 1, in which the total cross-sectional area of said grooves is approximately 25% of the gross cross-sectional area of the block.

5. A heat regenerative checker as set forth in claim 1, in which the other of said faces is a plane unbroken surface in a single plane.

6. A heat regenerative checker comprising a solid block of refractory material, the block being generally rectangular in form and having a length and width substantially greater than its thickness and having upper and lower faces, the upper face having a first upper surface in one plane and a second upper surface in a second plane parallel to but above said first upper surface, the lower face having a first lower surface aligned below said first upper surface and in a third plane parallel to said first plane and having a second lower surface aligned below said second upper surface and in a fourth plane above but parallel to said third plane, the distance of said second plane above said first plane being equal to the distance of said fourth plane above said third plane, and a plurality of parallel semi-circular grooves in each of said surfaces of said faces, each of the grooves in one of said faces being vertically aligned with a groove in the other of said faces.

7. A heat regenerative checker as set forth in claim 6, in which the diameter of each of said grooves is approximately one-half the maximum thickness of the block.

8. A heat regenerative checker as set forth in claim 6, in which the thickness of said block is approximately 0.75 inch and the diameter of each of said grooves is approximately 0.41 inch.

9. A heat regenerative checker as set forth in claim 6, in which the total cross-sectional area of said grooves is approximately 25% of the gross cross-sectional area of the block.

10. A heat regenerative checker comprising a solid block of refractory material, the block being generally rectangular in form and having a length and width substantially greater than its thickness and having upper and lower faces, the upper face having first and second upper surfaces in a first plane and a third upper surface in a second plane parallel to but above said first plane, said third upper surface being disposed between said first and second upper surfaces, the lower face having first and second lower surfaces aligned below said first and second upper surfaces, respectively, and in a third plane parallel to said first plane and having a third lower surface aligned below said third upper surface and in a fourth plane above but parallel to said third plane, the distance of said second plane above said first plane being equal to the distance of said fourth plane above said third plane, and a plurality of semi-circular grooves in each of said surfaces of said faces, each of the grooves in each of said surfaces being vertically aligned with a groove in the corresponding surface of the other face.

11. A heat regenerative checker as set forth in claim 10, in which the diameter of each of said grooves is approximately one-half the maximum thickness of the block.

12. A heat regenerative checker as set forth in claim 10, in which the thickness of said block is approximately 0.75 inch and the diameter of each of said grooves is approximately 0.41 inch.

13. A heat regenerative checker as set forth in claim 10, in which the total cross-sectional area of said grooves is approximately 25% of the gross cross-sectional area of the block.

14. A heat regenerative checker as set forth in claim 10, in which all of said surfaces are of equal width and have the same number of grooves.

15. A heat regenerative checker as set forth in claim 10, in which the third surfaces are twice the width of the first and second surfaces, and in which the third surfaces have twice the number of grooves of either the first or second surfaces.

References Cited in the file of this patent

UNITED STATES PATENTS

| | | |
|---|---|---|
| 2,493,470 | Tau | Jan. 3, 1950 |
| 2,622,864 | Hasche | Dec. 23, 1952 |

FOREIGN PATENTS

| | | |
|---|---|---|
| 144,043 | Germany | Sept. 23, 1903 |
| 680,458 | France | May 1, 1930 |